United States Patent [19]

Dorosz

[11] Patent Number: 4,516,456
[45] Date of Patent: May 14, 1985

[54] PALLET NIBBLER

[75] Inventor: Adolph S. Dorosz, Beverly, Mass.

[73] Assignee: USM Corporation, Farmington, Conn.

[21] Appl. No.: 508,862

[22] Filed: Jun. 29, 1983

[51] Int. Cl.³ ............................................. B26D 5/08
[52] U.S. Cl. ...................................... 83/578; 83/565; 83/622; 83/682; 83/916
[58] Field of Search .................. 83/916, 548, 549, 554, 83/565, 688, 49, 578, 527, 528, 530, 683, 693, 622, 682; 30/241

[56] References Cited

U.S. PATENT DOCUMENTS

| | | | |
|---|---|---|---|
| 2,343,073 | 2/1944 | Morin | 83/554 |
| 3,144,798 | 8/1964 | Leibinger | 83/916 X |
| 3,481,236 | 12/1969 | Nicklasson | 83/916 X |
| 3,988,829 | 11/1976 | Sumida | 83/916 X |
| 4,312,256 | 1/1982 | Herzog et al. | 83/916 X |

FOREIGN PATENT DOCUMENTS 803669 10/1958 United Kingdom ................. 83/554

*Primary Examiner*—James M. Meister
*Assistant Examiner*—John L. Knoble
*Attorney, Agent, or Firm*—Donald N. Halgren

[57] ABSTRACT

A machine for punching and nibbling a piece of sheet material, preferably metal, for subsequent manufacture into a pallet, said machine comprising a pair of dies disposable on each side of the sheet material, a punch shaft being pushable through one die, then through the sheet material, then through the other die, which punch shaft also begins a nibbling operation on the return stroke, because of a shoulder cut into the shaft itself. The punch shaft is empowered by a pressurizable cylinder and an electric motor on the initial punch stroke, and just the electric motor during the reciprocable nibbling function.

11 Claims, 3 Drawing Figures

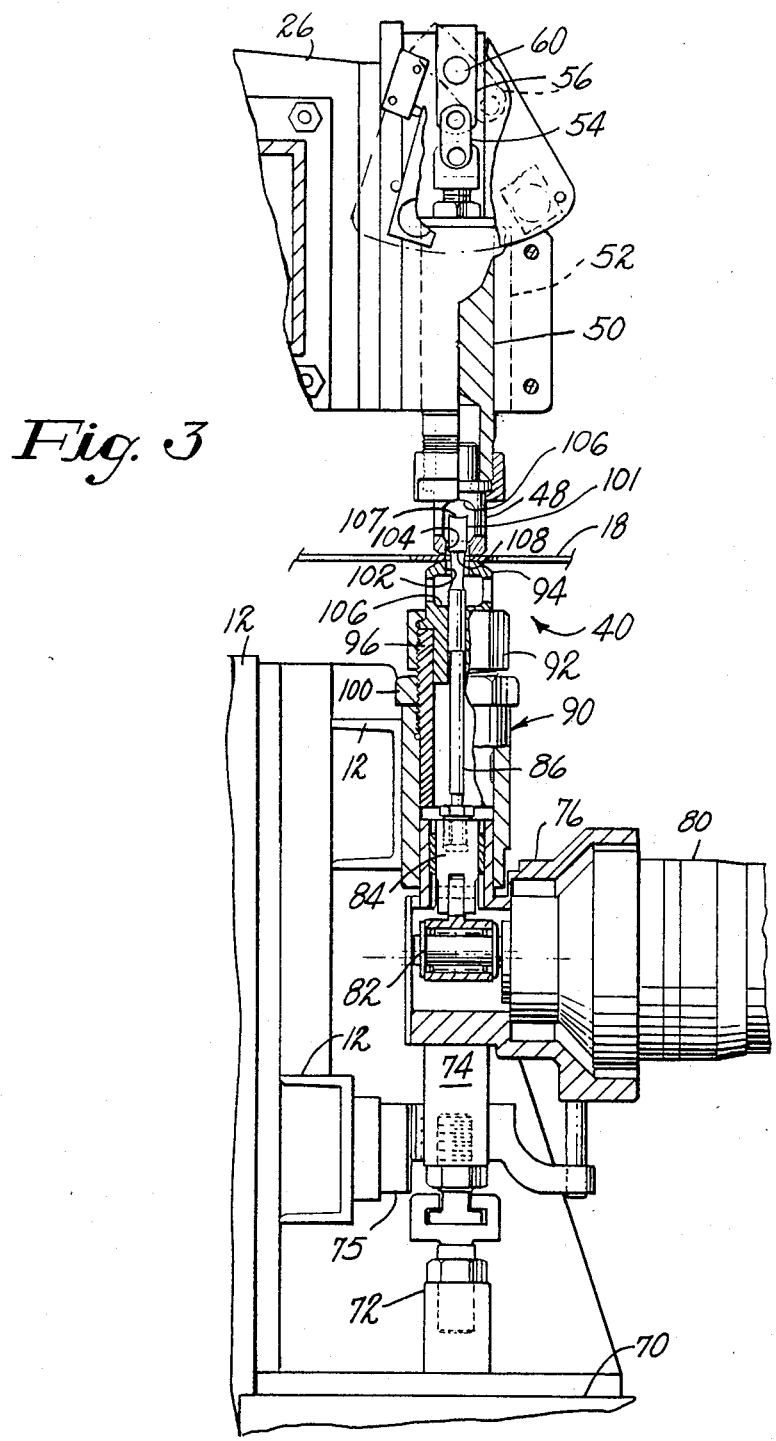

PALLET NIBBLER

BACKGROUND OF THE INVENTION (1) Field of the Invention

This invention relates to high speed punching apparatus and more particularly to punching and nibbling devices for cutting out portions of flat sheet material.

(2) Prior Art

Metal pallets have been recently devised so as to provide means for articulating several layers of shoe or fabric parts with respect to one another, wherein they may be stitched together by automatic sewing machines. The pallets are made from several layers of template-like sheet metal, hinged together at a common edge, as shown in U.S. Pat. No. 3,988,993. The sheet metal has cut-outs therein, which define the path to be followed by stitching needles. The cut-outs for these pallets may be done by hand, which is time consuming, and difficult to do accurately or they may be done expensivley by numerical controlled milling machines. Those machines are not always at a shoe or garment manufacturing facility, because of their expense, size and complexity. This thus requires a long lead time for changing a pattern on a pallet if a shoe or garment manufacturer wishes to do so. Other methods and machines may be utilized to manufacture the cut-outs in the sheet metal, by drilling or punching a hole in the material, then utilizing a nibbling machine or saw to cut out any particular pattern.

U.S. Pat. No. 3,760,676 shows a complex rotary drive punch machine for nibbling cut-outs in sheet material, comprising a clutch mechanism, thrust ball arrangements and other devices presenting a complicated apparatus.

U.S. Pat. No. 4,168,644 shows a punching and nibbling device which requires stopping of the operation to change tools before going ahead with the nibbling sequence. Similar relationships are shown in U.S. Pat. Nos. 4,241,631 and 3,988,829.

These machines represented by these patents do not permit a simple arrangement for punching and nibbling a cut-out in one or a series of pieces of sheet material.

It is an object of the present invention, to provide a combination punching and nibbling machine which will overcome the disadvantages of the prior art.

It is a further object of this invention, to provide a fast, repeatable and accurate machine for cutting out sections in sheet material, such as sheet metal, laminates, plastic or the like.

BRIEF SUMMARY OF THE INVENTION

The present invention comprises a novel machine utilizable for producing templates for aiding in the subsequent manufacture of multi-layer goods such as shoes or garments. A frame supports an X-Y base on which a master template may be disposed. The master template on the X-Y base may be moved orthogonally with regard to a fixed pilot arm. The fixed pilot arm extends from a portion of the frame, in spaced relation to a nibbling arrangement. The pilot arm has a finger on its distal end which is matable with the master template mounted on the X-Y base. A blank sheet of material to be made into an article of manufacture such as a pallet component may be locked into adjoining disposition on the X-Y base, adjacent the master template. The blank sheet of material may have an arrangement of alignment holes therein, through which a plurality of tapered pins may fit, properly locking the blank sheet into the X-Y base, providing accurate alignment between it and the master template as well as the nibbling arrangement.

The nibbling arrangement through which the blank sheet of material is movably disposed, comprises a reciprocably upwardly and downwardly movable upper die, a lower supporting die and a punch shaft displaceable vertically through each die. The punch shaft has a lower end which is attached through eccentric bearing means, to a motor which provides one of driving means for the punch shaft. The motor is mounted on a motivated sub-frame for guiding the punch shaft through the lower movable die.

A displacement means, such as a pneumatic piston and cylinder arrangement is secured to the frame and is attached at the lower portion of the sub-frame to vertically displace the sub-frame, the punch shaft, and the motor thereon.

The distal (upper) end of the punch shaft is adapted to have punch means thereat, so as to permit the punch shaft to make its own initial penetration of any blank sheet of material disposed within the nibbler arrangement. The punch shaft has a nibbling section adjacent (vertically below) the punch means, comprising a narrowed portion tapering from the outer periphery, inwardly and upwardly, which taper extends from the outer surface of the shaft to a narrow portion which defines an upper shoulder, having a definite circumferential edge which comprises the nibbling means on the punch shaft.

The punch shaft may be caused to punch an initial opening in a blank sheet due to the punch shaft being pushable therethrough by the displacement means arranged between the frame of the machine, and the sub-frame carrying the punch shaft and motor as well as by the rotation of the motor to add to the impetus thus comprising a combined displacement means. Upon creation of the initial opening, the motor is caused to continue rotating, effectuating a reciprocating stroke in the punch shaft, raising and subsequently lowering the nibbling means from a level above the surface of the sheet material to a level below the lower side of the sheet material, nibbling away cresent shaped chips of sheet material with each reciprocating stroke once the sub-frame, motor and punch shaft have been pushed to their highest position by the combined displacement means.

The punch shaft follows a path determined by the master template which templote is movable (together with the sheet of material on the X-Y base) with respect to the finger on the fixed pilot arm. The X-Y base may be moved manually on the frame of the machine, by a machine operator, who traces the contour to be cut-out, by moving the master template so as to make the finger on the pivot arm follow the contours in the master template.

The upper die is disposed on the lower end of an adjustable shaft which is journalled in a sleeve member. The adjustable shaft is pivotably connected to a first link, which first link is also connected to a swingable arm fixedly attached to a rotatable shaft, journalled at the top of the machine. When the rotatable shaft is rotated, it causes the swingable arm to pull on the first link, moving the adjustable shaft (and upper die) out of the way for cleaning and or replacement thereof.

Thus, a new pallet component duplicating the configured cut-out(s) of the master template may be manufactured a lot faster, and less expensively by a novel manufacturing method and apparatus, permitting rapid change of styles of shoes or garments being stitched together by a shoe or garment manufacturer. These new pallet components may be duplicated right in the manufacturer's facilities because of the simplicity, minimum size and minimum cost of the punch-nibbling system which produces these new articles of manufacture.

BRIEF DESCRIPTION OF THE DRAWINGS

The objects and advantages of the present invention will become more apparent when viewed in conjunction with the following drawings, in which:

FIG. 3 is a side elevational view, partially in section showing the details of a portion of the punch-nibbling mechanism, in a further step.

DESCRIPTION OF THE PREFERRED EMBODIMENT

Figure 1:
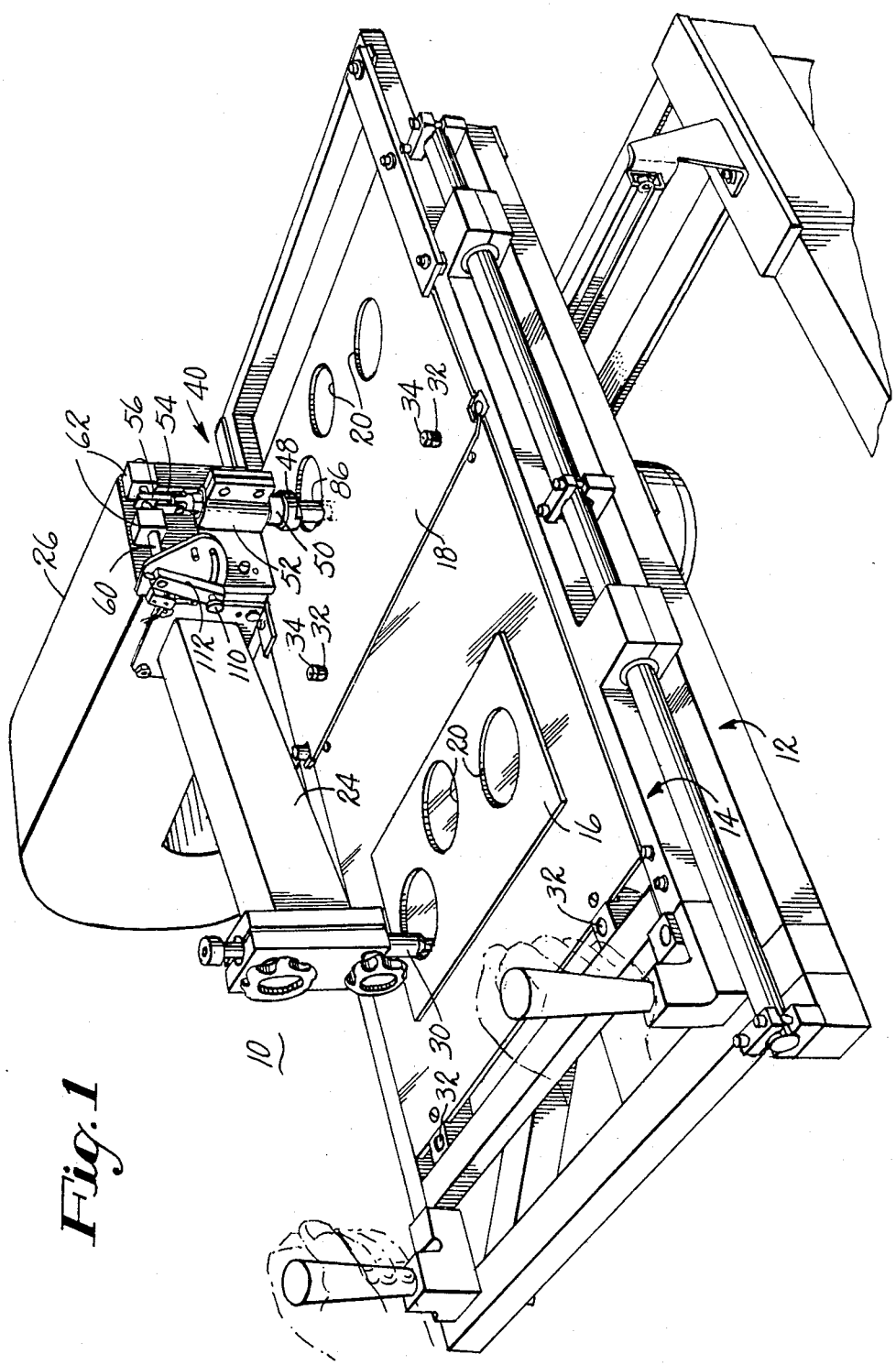
FIG. 1 is a perspective view of a punch-nibbling machine constructed according to the principles of the present invention, showing a new article of commerce manufactured therewith.

Referring now to the drawings in detail, and particularly to FIG. 1, there is shown a novel template punch-nibble machine 10 comprising a frame 12 on which an X-Y base 14 is slidably disposed. The X-Y base 14 may lockingly carry a master template 16 and a blank sheet of material 18 which is to be cut-out in a pattern of cut-outs 20 duplicative of that in the master template 16 and thereby produced as a new article of commerce.

A fixed pivot arm 24 extends from an upper "C" shaped portion 26 of the frame 12, over the central area of the master template 16, which is movable therebeneath. The pilot arm 24 has a rotatable finger 30 vertically journalled at the distal end thereof, the finger 30 being matable with the periphery of any cut-out(s) 20 in the master template 16.

The blank sheet of material 18 may have an arrangement of alignment holes 32 therein, registertable with socket means therebeneath, on the X-Y base 14, a tapered pin 34 being matably registerable through the alignment holes 32 and their respective sockets, not shown, in the X-Y base, to properly align the sheet of material 18 with the template 16, and a nibbling mechanism 40.

Figure 2:
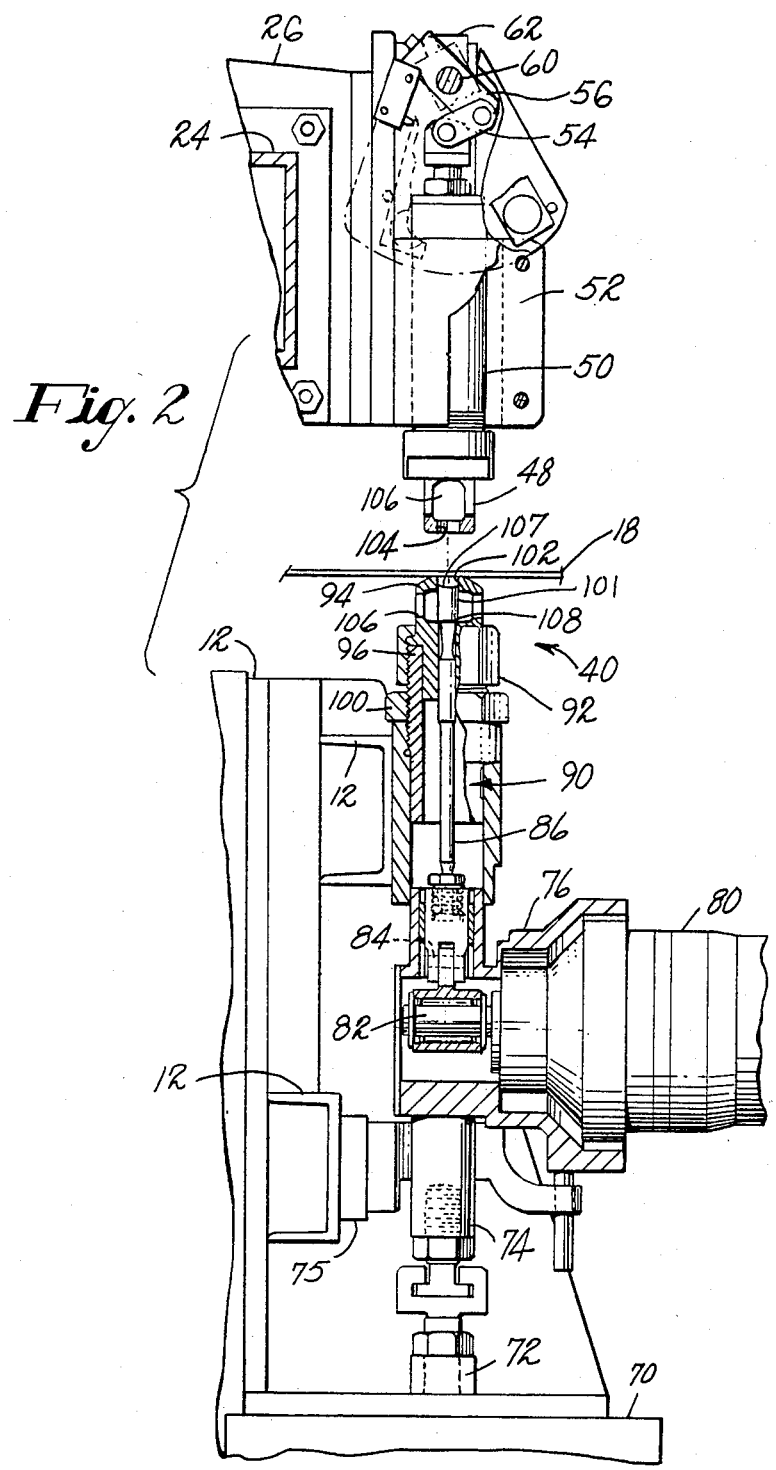
FIG. 2 is a side elevational view, partially in section of the punch-nibbling mechanism, with the article produced thereby.

The nibbling mechanism 40 is partially shown in FIG. 1 wherein the sheet of material 18 is movably disposed thereat and is also shown in FIGS. 2 and 3. The nibbling mechanism 40 comprises a reciprocably upwardly and downwardly movable upper die 48 secured to the lower end of an axially displaceable shaft 50. The mid portion of the displaceable shaft 50 is journalled in a sleeve 52 attached to the distal end of the upper "C" shaped portion 26 of the frame 12. The upper end of the displaceable shaft 50 is attached to a pivotable link 54, at the top of the shaft, which itself is pivotably connected to a swingable arm 56, which arm 56 is secured to a horizontally disposed shaft 60, journalled in a pair of supports 62 arranged on the upper distal end of the upper "C" shaped portion 26 of the frame 12.

The nibbling mechanism 40 also comprises a lower portion, shown in FIGS. 2 and 3, having a punch empowering means 70 which may be a pressurizable piston or the like, attached to the frame 12. A piston rod 72 extends upwardly from the empowering means 70, and is connected to the lower end of a first lower shaft 74 which is journalled through an extension 75 of the frame 12 and is attached to a movable sub-frame 76. An electric motor 80 is secured to the sub-frame 76, and has an eccentric output shaft 82 to which a connecting rod 84 is attached. A punch shaft 86 is secured, at its lower end, to the connecting rod 84, the punch shaft 86 being journalled in a sleeve assembly 90 which sleeve assembly 90 is secured to a portion of the frame 12. The sleeve assembly 90 includes a threaded nut 92 which holds a lower die 94 to a threaded coupling 96 inside a housing 100.

The punch shaft 86 has an upper end 101 which is reciprocably disposable through an opening 102 in the lower die 94 and through an opening 104 in the upper die 48. The lower and upper dies 94 and 48 each have orifii 106 on their sides to permit metal chips to escape during the nibbling operation.

The upper end 101 of the punch shaft 86 has a concave uppermost surface 107 with sharp peripheral edges, as shown in FIGS. 2 and 3. This permits a punching or cutting action therewith as the shaft 86 is initially pushed through the article of commerce being formed.

Inwardly along the shaft 86 from the concave surface 107 of the upper end 101 of shaft 86, there is a shoulder section 108 providing a stepped reduction in diameter of the shaft 86. This shoulder section 108 tapers inwardly to a thinner diameter of the shaft 86 a longitudinal distance therealong at least equal to the distance the eccentric bearing 84 oscillates the shaft 86.

The top surface of the lower die 94 is in supportive contact with the lower surface of the sheet of material 18 being punched and nibbled, which is sheet metal, in this embodiment.

In operation of the machine 10, the sheet of material 18 to be punched/nibbled is loaded onto the X-Y base 14. The distance between the finger 30 and the punch shaft 86 is the same as the distance between the alignment holes 32 on the surface securely supporting the master template 16 and the alignment holes 32 on the article of sheet material 18 being transformed into a pallet or new article of commerce. It is to be noted that the holes 32 could easily be notches at corresponding edges or the like.

A knob 110 is disposed on the distal end of an arm 112 secured to the end of the horizontal shaft 60 to enable a machine operator to cause the link 54 and swingable arm 56 to straighten out and effectuate the displacement of the displaceable shaft 50 downwardly, to cause the lower surface of the upper die 48 to be disposed against the article 18 being manufactured, holding it securely, against the top surface of the lower die 94 while still permitting it to be moved transversely therebetween.

Proper actuation of the punch empowering means 70 effectuates longitudinal upward displacement of the piston rod 72, pushing upwardly the first lower shaft 74, the sub-frame 76 holding the motor 80, and the punch shaft 86, from a position shown in FIG. 2 to the position of those components as shown in FIG. 3. Simultanously with the actuation of the punch empowering means 70, the motor 80 may be energized by proper means, not shown, to effectuate the cyclical reciprocation of the punch shaft 86 as it is advanced toward and through the article to punched/nibbled. This combined pushing by the empowering means 70 together with the drive by the motor 80 permits a smaller empowering means 70 to be utilized than would otherwise be required to punch through a piece of sheet material 18 typically metal, from which the article of commerce is being manufactured.

Upon punching through the sheet of material 18, as shown in FIG. 3, the motor 80 still effectuates reciprocating motion in the punch shaft 86, while the empowering means 70 is held stationary at its full displacement position. The shoulder section 108 of the upper end 101 of the punch shaft 86 just clears the upper surface of the sheet of material 18, and the sheet of material 18 may be moved, together with the entire X-Y base 14, preferably by hand, with the rotatable finger 30 following the contour of the cut-out(s) 20 in the template 16. As the sharp, hardened shoulder section 108 is moved in its cycle downwardly, it nibbles a "C" shaped piece of material from the sheet of material 18 as it is being moved between the dies 48 and 94.

The finger 30 is preferably of circular cross-section, of a diameter equal to the diameter of the punch shaft 86 at the smaller diameter adjacent the shoulder 108. The finger 30 may be allowed to rotate as it is caused to trace the contours of the cut-out(s) 20. The finger 30 may be of larger (or smaller) diameter than the nibbling portion of the punch shaft 86, and if so, the corresponding portion(s) cut-out from the article of manufacture 18 would then be smaller (or larger) than the cut-out(s) 20 of the master template 16 by a dimension equal to the difference of their respective radii.

Thus there has been shown a novel machine utilizable in the shaping of an article of manufacture, wherein a single tool is used to both punch and nibble a flat sheet of material, the tool being driven by a combination of means permitting the minimization of the punch driving means, the overall cost of the equipment, and the time necessary to operate the machine. The article of manufacture described herein, may be made from a sheet of metal, plastic, a laminate or the like.

Though the invention is described in particular terms it is intended that the appended claims be interpreted as exemplary only, and not in a limiting sense.

I claim:

1. A machine for punching and nibbling a sheet of material, comprising:
   a base movably supporting a sheet of material to be worked;
   a common reciprocable shaft having punching means for punching a hole with a first stroke through said sheet of material, and having nibbling means also on said shaft adjacent said punching means for nibbling said material on the return stroke of said shaft for fast and simple utilization thereof; and
   a die arrangement for guiding said reciprocable shaft.

2. A machine for punching and nibbling a sheet of material, as recited in claim 1, wherein said reciprocable shaft has drive means thereattached to effectuate its punching through a sheet of material and to permit said shaft to nibble a contour out of said sheet of material.

3. A machine for punching and nibbling a sheet of material, as recited in claim 2, wherein said drive means comprises a punch empowering means and a nibbling empowering means.

4. A machine for punching and nibbling a sheet of material, as recited in claim 2, wherein said die arrangement comprises an upper die and a lower die, each contactable with its respective side to a sheet of material to be worked.

5. A machine for punching and nibbling a sheet of material, as recited in claim 4, wherein said upper die is displaceable upwardly and downwardly with respect to a sheet of material to be worked arranged on said base.

6. A machine for punching and nibbling a sheet of material, as recited in claim 4, wherein said lower die is stationary as said punching and nibbling shaft is displaced to effectuate the punching of a sheet of material.

7. A machine for punching and nibbling a sheet of material, comprising:
   a punch shaft movable through a pair of supportive dies, said dies being arranged so as to permit a sheet of material to be disposed therebetween;
   said punching shaft also having nibbling means thereon so as to permit said sheet of material to be punched on a first stroke and to be nibbled on the return stroke of said shaft.

8. A machine for punching and nibbling a sheet of material, as recited in claim 7, wherein said punch shaft has a concave portion to enable it to punch through a sheet of material while being guided through said pair of supportive dies;
   said punch shaft also having said nibbling means near said concave portion to permit immediate nibbling of a sheet of material after it has been punched through facilitating economy of motion and minimizing the material necessary for the manufacture of said shaft.

9. A machine for punching and nibbling a sheet of material, as recited in claim 8, wherein said nibbling means of said shaft comprises a shoulder defining a portion of said shaft of reduced diameter from said concave portion.

10. A machine for punching and nibbling a sheet of material, as recited in claim 8, wherein said punch shaft is pushed through a sheet of material by an empowering means and a punch shaft reciprocating means.

11. A machine for punching and nibbling a sheet of material as recited in claim, 8, wherein said punch shaft reciprocating means comprises an electric motor having an output shaft with an eccentric bearing thereon attachable to said punch shaft.

* * * * *